United States Patent
Perrine

(10) Patent No.: US 6,835,257 B2
(45) Date of Patent: Dec. 28, 2004

(54) ULTRASONIC WELD PATTERN FOR ADSORBENT CONTAINING PACKAGE

(75) Inventor: Glenn D. Perrine, Eaton, OH (US)

(73) Assignee: Flow Dry Technology Ltd, Brookville, OH (US)

(*) Notice: Subject to any disclaimer, the term of this patent is extended or adjusted under 35 U.S.C. 154(b) by 0 days.

(21) Appl. No.: 10/447,416

(22) Filed: May 29, 2003

(65) Prior Publication Data

US 2003/0213543 A1 Nov. 20, 2003

Related U.S. Application Data

(63) Continuation-in-part of application No. PCT/US01/44618, filed on Nov. 27, 2001.
(60) Provisional application No. 60/250,559, filed on Dec. 1, 2000.

(51) Int. Cl.$^7$ .............................................. B32B 31/16
(52) U.S. Cl. ................... 156/73.1; 156/580.2; 53/479; 53/DIG. 2; 383/100
(58) Field of Search .......................... 156/73.1, 290, 156/292, 308.2, 308.4, 580.1, 580.2; 383/100, 102; 53/479, DIG. 2; 493/189, 209

(56) References Cited

U.S. PATENT DOCUMENTS

| 4,517,790 A | | 5/1985 | Kreager |
| 4,759,170 A | * | 7/1988 | Sawa et al. .................. 53/551 |
| 4,767,492 A | | 8/1988 | Fukusima et al. |
| 5,400,568 A | * | 3/1995 | Kanemitsu et al. .......... 53/412 |
| 5,606,844 A | * | 3/1997 | Takagaki et al. ............. 53/410 |

OTHER PUBLICATIONS

Cerex Advanced Fabrics, L.P., *Snow Filtration*, Product Information Sheets pp. 4, 5, 278, 279, Jun. 4, 1998.

* cited by examiner

*Primary Examiner*—James Sells
(74) *Attorney, Agent, or Firm*—Wegman Hessler & Vanderburg

(57) ABSTRACT

Method of preparing an adsorbent containing package and package made thereby. The method comprises providing a mounting surface of the package and heat fusing the mounting surface via ultrasonic welding to provide a multiplicity of depressed hard seal portions and relief surfaces on the mounting surface. The ratio of hard sealed portions to total seal area is within 10–60%.

28 Claims, 4 Drawing Sheets

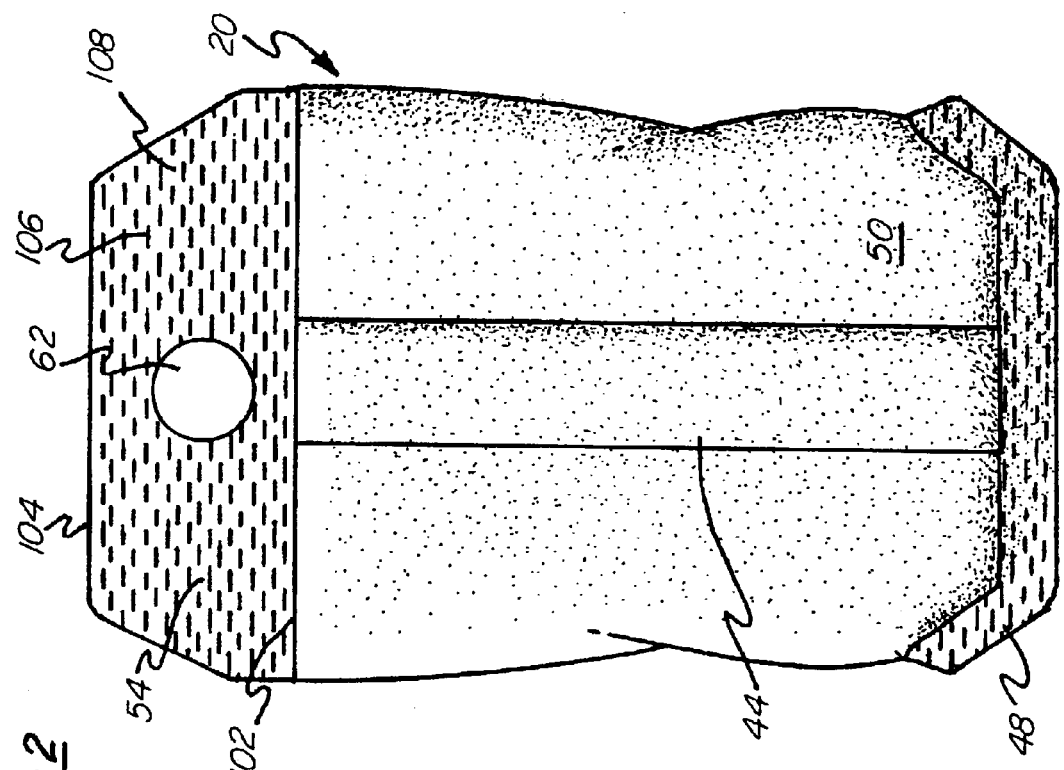
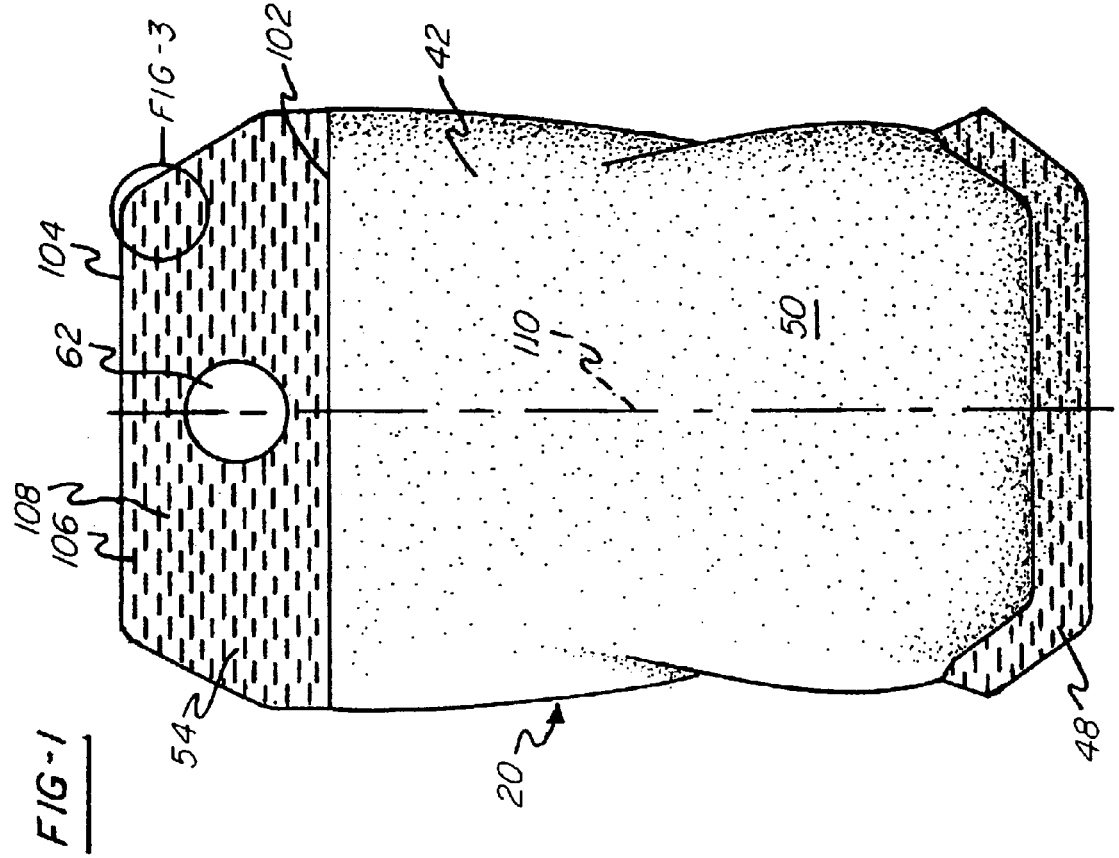

_US 6,835,257 B2_

ULTRASONIC WELD PATTERN FOR ADSORBENT CONTAINING PACKAGE

CROSS REFERENCE TO RELATED APPLICATIONS

This application is a Continuation-in-Part (CIP) of International PCT Application Number PCT/US01/44618 filed Nov. 27, 2001 and designating the United States, which claimed the benefit of prior U.S. Provisional Application No. 60/250,559 filed Dec. 1, 2000.

FIELD OF THE INVENTION

The invention relates to adsorbent containing packages having improved ultrasonically welded seam components with intermittent sealed portions and relief portions.

SUMMARY OF THE INVENTION

Typically a large area of material is ultrasonically welded to seal the desiccant package closed and provide a means to attach the package to the inside of an automotive air conditioning accumulator, condenser or receiver/dryer. Once welded, this large sealed area restricts the flow of oil and refrigerant thus reducing the oil circulation efficiency of the ac system. To make a weld, an ultrasonic horn and a smooth faced steel anvil are used to compress the bag materials therebetween. Energy is then applied to the ultrasonic horn thus welding the bag material. Typically a smooth faced horn is used to provide for a continuous smooth weld that is very dense and fluid impermeable. This invention provides for a texture to be applied to the face of the anvil. This texture produces a pattern weld in the bag material including hard sealed areas where the weld is extremely dense and fluid impermeable and relief areas where the bag material is not welded and is very permeable.

Care must be taken to ensure that the seam area comprises the proper proportion of the hard sealed portions and relief portions so that the weld area will be properly sealed while allowing for desired permeability. An additional advantage is that the textured weld reduces the energy required to produce a weld and thus reduces the cycle time of the machine to manufacture the bag.

The adsorbent material package of the present invention comprises an elongated pouch or the like adapted for filling with desiccant or other adsorbent medium therein. Preferably, the package is made of a porous, non-woven, material such as a spun bonded nylon material, spun bounded polyester material, or polyester felt. An aperture is provided in one end of the package and is surrounded by an ultrasonically sealed mounting zone. The package aperture is force or snap fit over a flange or the like associated with the bleed filter that is in turn connected to the bight portion of the suction tube of the accumulator or similar a/c piping structure. In typical accumulator structures, the bight portion is oriented transversely with respect to the longitudinal axis of the cylindrical housing and connects upwardly extending legs of the fluid flow tube.

A longitudinally disposed seam member is formed along the length of the top or bottom side of the adsorbent pouch. This seam includes a double fabric layer area and may be formed via conventional means such as heat sealing, ultrasonic sealing, or other electronic sealing or fusing means.

BRIEF DESCRIPTION OF THE DRAWINGS

FIG. 1 is a top plan view of an adsorbent material package in accordance with the invention;

FIG. 2 is a bottom plan view of the package shown in FIG. 1;

DETAILED DESCRIPTION OF THE PREFERRED EMBODIMENT

Figure 3:
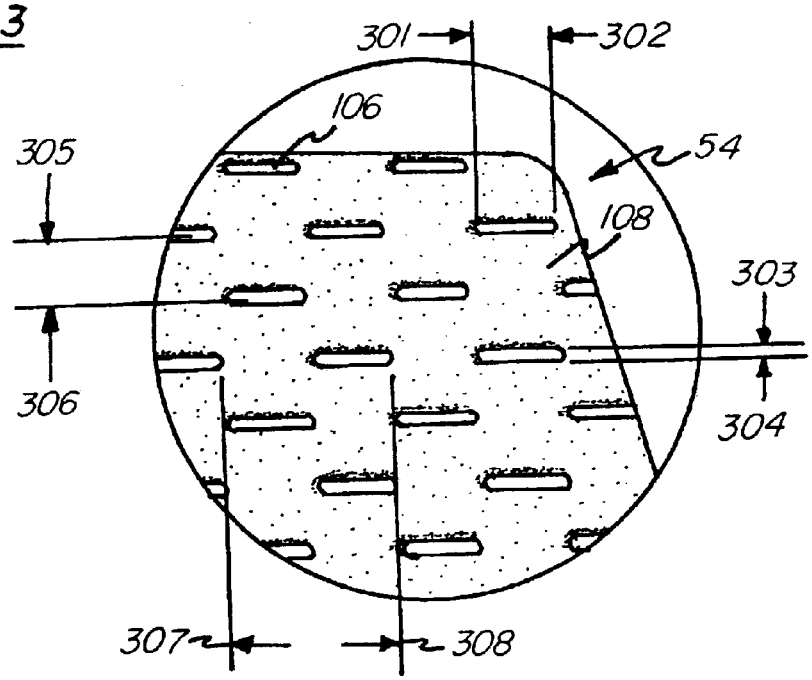
FIG. 3 is a magnified view of a section of an the mounting zone of the package shown by the broken line circle in FIG. 1.

Turning now to FIGS. 1 and 2, there is shown an adsorbent package 20 in accordance with the invention. The top side or surface 42 of the package or packet is shown in FIG. 1. Here, the elongated packet material comprises pouch end seams 48, 54 sealing the respective longitudinal ends of the package. A longitudinally extending seam 44 (FIG. 2) extends longitudinally along the length of the back of the elongated packet and is slightly laterally offset from a longitudinally extending bisector line extending through the package. This seam 44 provides a double thickness of the felt like material used to form the packet 20 and therefore can be referred to as a reinforcement area.

The pouch end seams 48, 54 and the longitudinally extending reinforcement seam 44 define a pouch 50 therebetween adapted to contain adsorbent material (not shown) therein.

The end seam 54 serves as a mounting zone by which the packet will be attached to the bight tube filter or the like in an accumulator, receiving dryer or condenser. As shown, a centrally located aperture 62 is adapted for snap fitting over the bleed filter positioned on the bight tube.

The mounting zone surrounds the aperture and extends between transverse borders 102, 104 of the packet.

As shown herein, both the mounting zone and the end seam 48 are ultrasonically welded to include a multiplicity of spaced, hard sealed areas 106, existing in a sea or matrix of relief areas 108. More specifically, as shown, the areas 106 and 108 alternate along vectors that are parallel to the longitudinal axis 110 of the packet and along vectors parallel to a direction perpendicular to the axis 110. The hard sealed areas 106 are highly compressed and relative to the generally planar relief areas 108, comprise generally oblong shaped areas of depression. These areas 106 are generally indented or depressed at a distance of about 0.030" relative to the plane of the surfaces 108.

Preliminary observations reveal that the positioning of the multiplicity of relief areas throughout the mounting zone aids in increased permeability of fluid including refrigerant, air, moisture and compressor lubricating oil through the zone. At the same time, the multiplicity of hard sealed areas 106 ensure adequate sealing of the plies of the packet material together.

In order to make the packet 20, a tubular material is first provided. At present, it is preferred to provide a non woven spun bonded nylon material for the packet. Presently, this material is available under the designation "Cerex PBN-2"

sold by Cerex, Advanced Fabrics, L.P., Cantonment, Fla. This product is described as a non-woven that is made by spinning and thermally bonding continuous filaments of nylon into a "drapable, conformable, textile-like fabric." Some have also referred to this material as a point bonded nylon.

The bottom of the material is then sealed via heat seal, or other electronic sealing system with the instant ultrasonic sealing method preferred, to form a pouch. Then, the desired desiccant is filled into the pouch. The top longitudinal edge of the packet comprising the above noted mounting zone is ultrasonically welded to provide alternating hard sealed and relief areas. At the same time, the bottom half of the next succeeding bag in the production run is sealed and the procedure repeated so that successive bags can be made. After each bag 20 is cut, the mounting aperture is cut in the middle of the mounting zone.

Figure 4:
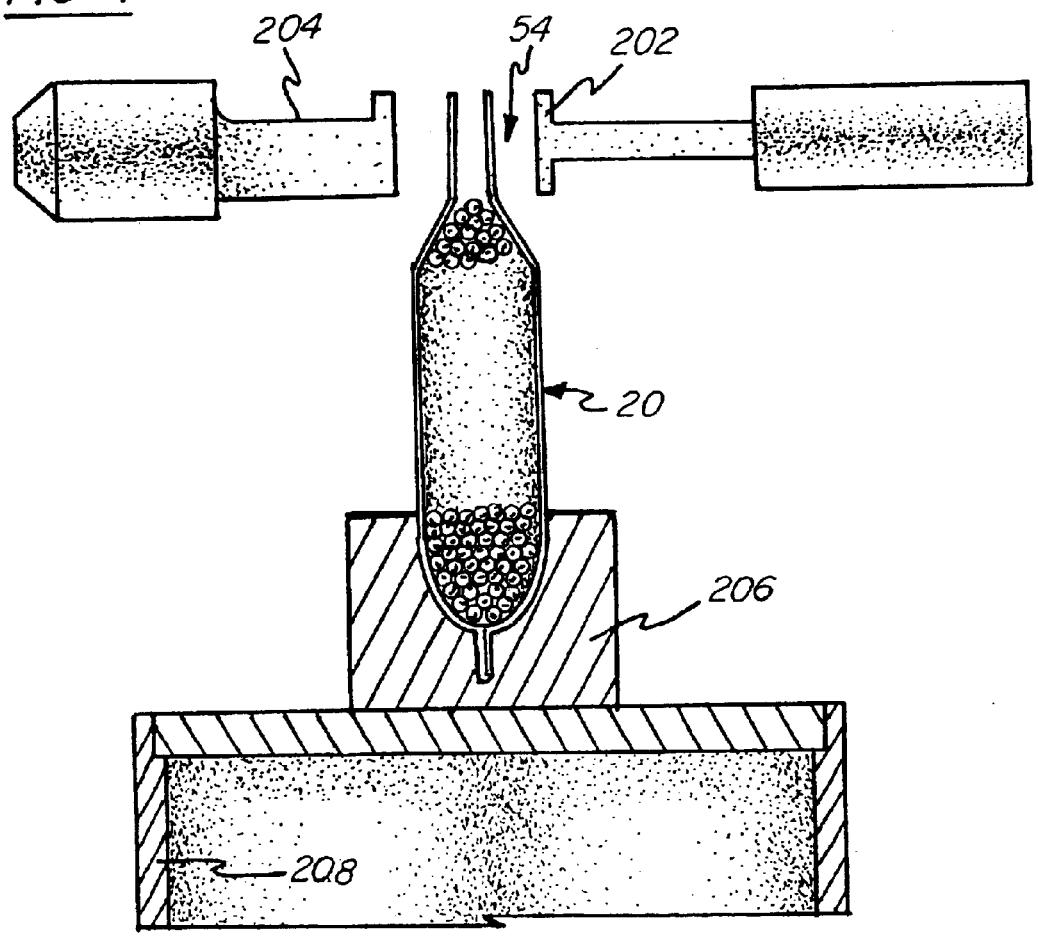
FIG. 4 is a schematic view of an ultrasonic welding apparatus that is used to ultrasonically form the mounting zone in accordance with the invention.

In accordance with the invention, ultrasonic welding of the mounting surface may be performed in conjunction with an apparatus of the type shown schematically in FIG. 4. Details pertaining to this apparatus may be gleaned by review of U.S. Pat. No. 4,767,492, the disclosure of which is hereby incorporated by reference herein.

As shown in FIG. 4, the ultrasonic welding apparatus comprises a horn member 204 and anvil 202 adjacent the horn. As shown, the anvil member 202 is retractable into a bag engaging and bag release position. In FIG. 4, the apparatus is shown in a position prior to ultrasonic fusion of the mounting surface 54.

During the fuse bonding process, the mounting surface 54 of the bag is clamped between the horn 204 and cooperating anvil 202. At the same time, the bottom edge 48 of the packet 20 is firmly grasped within holding member 206 that may be disposed on a conveyor 208 or the like.

In accordance with conventional ultrasonic welding methods, the surface 54 is fuse bonded by the frictional heat caused by ultrasonic vibration of the horn member 204. As is conventional in the art, the horn 204 is electrically connected to a suitable oscillator and vibrator (not shown). In the apparatus set forth in U.S. Pat. No. 4,767,492, the horn operates at a vibration frequency of 20 KHz with a power output of 1.8 kW.

Figure 5:
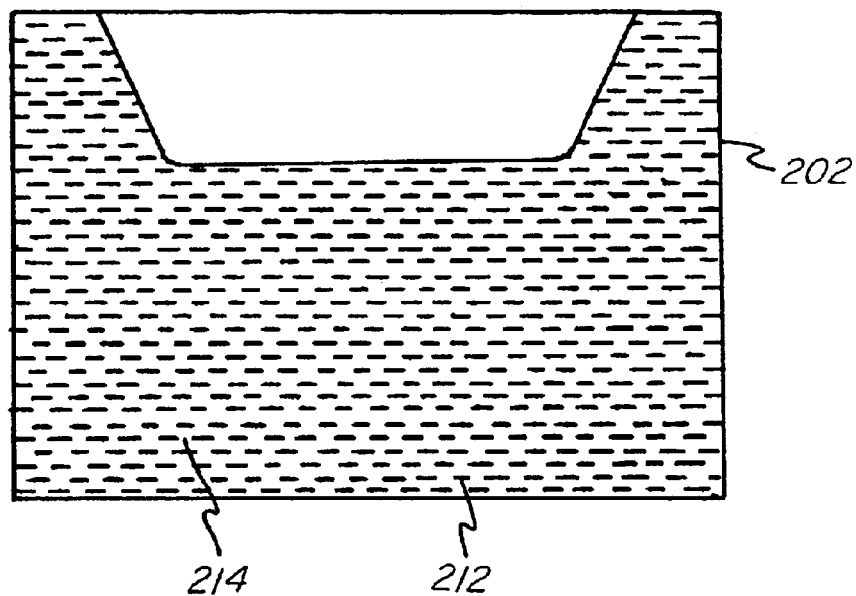
FIG. 5 is a schematic view of the top surface of the anvil portion of the ultrasonic welding apparatus shown in FIG. 4.

Turning now to FIG. 5, the face of the anvil member 202 is shown. Face 210 is provided with a multiplicity of raised portions 212 and planar relief portions 214. In accordance with the ultrasonic welding method, the edges of the packet that ultimately form the mounting surface 54 are pressed between the horn and anvil 202 and the raised surfaces 212 of the anvil impart the specific heat sealed areas 106 that are formed in the mounting zone of the packet.

In one particular embodiment of the invention, (shown in FIG. 3) the hard sealed areas each comprise a generally oblong shape with length measured along the longitudinal axis of 0.089" (dimension 301, 302) and a transverse dimension of 0.012" (dimension 303, 304).

Although only the anvil member is herein shown to include raised portions to provide the desired texture to the mounting zone 54 of the packet, the artisan will appreciate that the horn surface could also be provided with such a texture forming area or in some cases both the anvil and horn could be provided with complementary texturing surfaces.

As shown in the exemplary embodiment of FIG. 3, the hard sealed areas are provided in a plurality of horizontally extending rows with the rows separated by 0.075" (dimension 305, 306). As positioned along each row, a hard sealed area is spaced from its neighboring hard sealed area by 0.200" (dimension 307, 308) as measured from one end of a hard sealed area to the corresponding end of an adjacent hard sealed area in the row.

Figure 6:
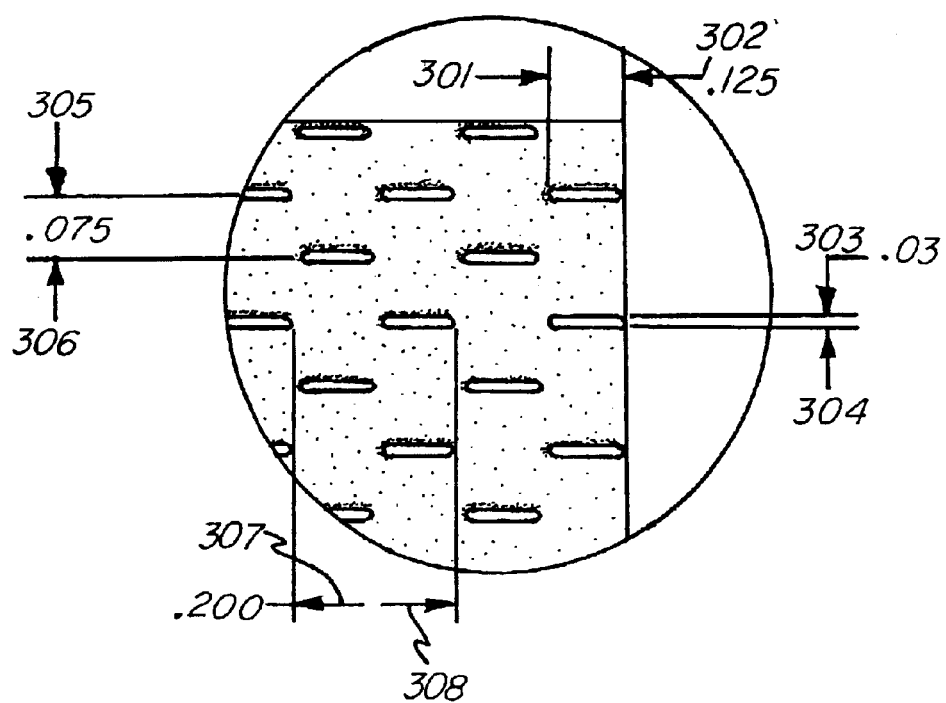
FIG. 6 is another exemplary embodiment of the mounting zone according to the invention.

In another embodiment shown in FIG. 6, the length of the oblong shaped hard sealed areas is 0.125" (301, 302) and the transverse dimension is 0.03 (303, 304). The other dimensions, namely the separation between each horizontal row of hard sealed areas (305, 306) and the neighbor spacing between each hard sealed areas (307, 308) is the same as that shown in FIG. 3. The embodiment shown in FIG. 6 is a Standard weld pattern used on 9.5 ounce felt bags, for instance, wherein the percentage of hard-sealed weld areas to entire seam area is about 23.7%.

Figure 7:
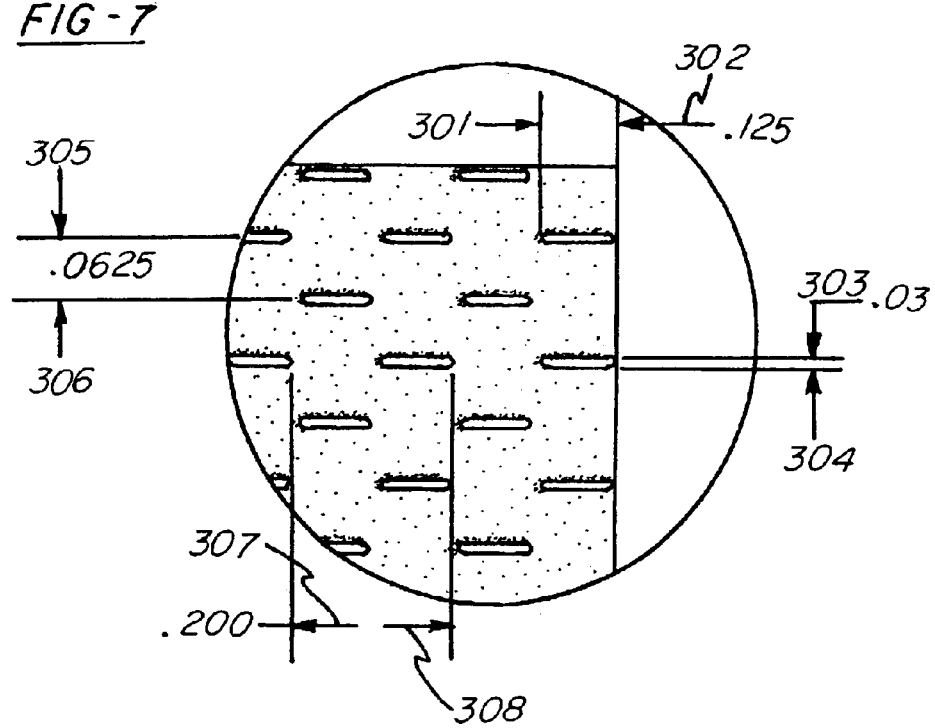
FIG. 7 is another exemplary embodiment of the mounting zone of the package according to the invention.

In yet another exemplary embodiment shown in FIG. 7, the length, transverse dimension and neighbor spacing is as shown in FIG. 6. However, the separation between horizontal rows is 0.0625" (305, 306) in FIG. 7 compared to 0.75" in FIG. 6. The embodiment shown in FIG. 7 is a Plus Two, or Delphi, weld pattern used on 7.5 ounce felt bags, for instance, wherein the percentage of hard-sealed weld areas to total seam area is about 26.4%.

Figure 8:
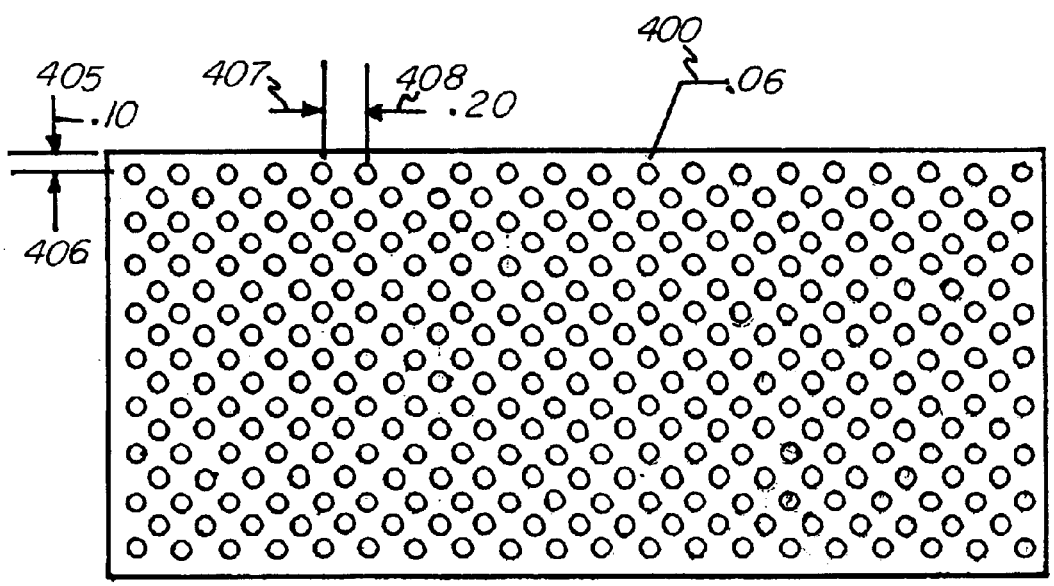
FIG. 8 is another exemplary embodiment of the mounting zone of the package according to the invention.

In still yet another exemplary embodiment of the mounting zone of the package shown in FIG. 8, the hard sealed areas 106 each comprise a generally circular shape, rather than the generally oblong shape of earlier described embodiments. The circular hard sealed areas of FIG. 8 each have a diameter of 0.06" (400). The circular hard-sealed areas are provided in a plurality of horizontally extending rows with the raised portions separated by 0.10" (405, 406). Each hard sealed area in a row is spaced from its neighboring hard sealed area by 0.200" (407, 408), as measured from the diameter (400) of one hard-sealed area to the corresponding diameter (400) of an adjacent hard-sealed area in the row. The embodiment shown in FIG. 8 is a Dot weld pattern used on felt bags with tucked ends, for instance, wherein the percentage of hard-sealed weld areas to total seam area is preferably about 14.1%.

We have found that an area ratio of hard-sealed weld areas to total seam area of about 10% to about 60% provides an optimum blend of fluid impermeable and fluid permeable areas in the seam to provide structural integrity to the package while allowing for adequate fluid flow through the seam. A range of about 10–40% is preferred.

Although the embodiments shown above are directed to desiccant containing pouches or packets designed primarily for use in automotive structures and systems, the artisan will appreciate that the packets may also be used in conjunction with other desiccant containing packages adapted for a variety of industries.

What is claimed is:

1. A method of preparing a pouch including an improved fluid permeability fused surface comprising providing a multiplicity of depressed hard sealed portions and relief portions in said fused surface.

2. A method of preparing an adsorbent containing package including an improved fluid permeability mounting surface for mount of said package to a cooperating support structure of an automotive air conditioning system comprising fusing said package at said mounting surface, and providing a multiplicity of depressed, hard sealed portions and relief portions in said mounting surface.

3. A method of preparing an adsorbent containing package including an improved fluid permeability mounting surface adapted for mounted disposition adjacent a cooperating support structure of an automotive air conditioning system said method comprising, heat fusing said mounting surface of said package by ultrasonic welding, said ultrasonic welding comprising placing said package between a vibratory horn and a cooperating anvil surface, and providing a multiplicity of raised surfaces on one of said horn and anvil surfaces whereby, during said ultrasonic welding of said package a multiplicity of depressed hard sealed portions and relief portions are formed in said mounting surface.

4. A method as recited in claim 3 wherein said raised surfaces are provided on said anvil surface.

5. An adsorbent containing package, said packet having first and second sealed longitudinal ends, a sealed mounting zone located between said first and second sealed ends, said mounting zone including a fused section of said package and including a multiplicity of depressed hard sealed portions and relief portions formed therein.

6. An adsorbent containing package as recited in claim 5 further comprising an aperture in said mounting zone.

7. An adsorbent containing package as recited in claim 5 wherein said multiplicity of depressed hard sealed portions comprise a multiplicity of generally oblong shaped depressions, with adjacent depressions separated by a relief area.

8. An adsorbent containing package as recited in claim 5 wherein said package is composed of a member selected from the group of polyester felt, spun bonded polyester and spun bonded nylon.

9. An adsorbent containing package as recited in claim 8 wherein said package is composed of spun bonded nylon.

10. An adsorbent containing package as recited in claim 5 wherein said oblong shaped depressions are arranged in a plurality of rows transverse to a longitudinal axis passing through said package.

11. The adsorbent containing package as recited in claim 5, wherein the ratio of hard sealed portions to total fused section area is within the range of 10–60%.

12. The adsorbent containing package as recited in claim 7, wherein the oblong shaped depressions are each 0.089 inches in length, 0.012 inches in width, extend in horizontal rows separated by 0.75 inches, and are end-to-end spaced 0.200 inches from an adjacent depression in a common row.

13. The adsorbent containing package as recited in claim 12, wherein the length of each depression is 0.125 inches and the width is 0.03 inches.

14. The adsorbent containing package as recited in claim 13, wherein the ratio of hard sealed portions to total fused section area is 23.7%.

15. The adsorbent containing package as recited in claim 13, wherein the separation between horizontal rows is 0.0625 inches.

16. The adsorbent containing package as recited in claim 15, wherein the ratio of hard sealed portions to total fused section area is about 26.4%.

17. The adsorbent containing package as recited in claim 5, wherein the multiplicity of depressed hard sealed portions are circular, with adjacent depressions separated by one of the relief portions.

18. The adsorbent containing package as recited in claim 17, wherein each depression has a diameter of 0.06 inches, and the multiplicity of depressions extend in horizontal rows separated by 0.10 inches, and each depression is diameter-to-diameter spaced 0.200 inches from an adjacent depression in a common row.

19. The adsorbent containing package as recited in claim 18, wherein the ratio of hard sealed portions to total fused surface area is about 14.1%.

20. The method of claim 1, further comprising providing a ratio of hard sealed portions to total fused surface area within a range of about 10% to about 60%.

21. The method of claim 20, wherein the hard sealed portions are oblong.

22. The method of claim 20, wherein the hard sealed portions are circular.

23. The method of claim 2, further comprising providing a ratio of hard sealed portions to total mounting surface area within a range of about 10% to about 60%.

24. The method of claim 23, wherein the hard sealed portions are oblong.

25. The method of claim 23, wherein the hard sealed portions are circular.

26. The method of claim 3, further comprising providing a ratio of hard sealed portions to total mounting surface area within a range of about 10% to about 60%.

27. The method of claim 26, wherein the hard sealed portions are oblong.

28. The method of claim 27, wherein the hard sealed portions are circular.

* * * * *